Oct. 20, 1953 P. P. HEPP 2,656,192
CHUCK
Filed April 28, 1952

INVENTOR:
PETER P. HEPP
BY
Gravely, Lieder, Woodruff & Dees
ATTORNEYS

Patented Oct. 20, 1953

2,656,192

UNITED STATES PATENT OFFICE 2,656,192

CHUCK

Peter P. Hepp, Beaumont, Calif.

Application April 28, 1952, Serial No. 284,786

10 Claims. (Cl. 279—56)

This application is a continuation-in-part of my co-pending application Serial No. 151,181 filed March 22, 1950, now abandoned.

This invention relates to a chuck and it is one object of the invention to provide a chuck which may be mounted upon a chuck holder of a lathe, or drill press or the like, said chuck having a portion which may be non-rotatably shifted in a longitudinal direction to release the jaws of the chuck.

Another object of the invention is to provide a chuck wherein its body is either rotatably or non-rotatably moveable longitudinally along a plunger and is held against non-rotatable movement by latches which grip threads of the plunger, said latches being automatically moved to a releasing position when a collar member is shifted forwardly.

Another object of the invention is to provide a chuck wherein the latches are provided with shanks which pass through a collar which is slidable longitudinally along a neck extending rearwardly from a block which closes the rear end of the body, the collar having portions formed with cam surfaces which retract the latches when the collar is shifted forwardly and thus allow the body to be shifted forwardly.

Another object of the invention is to provide the latches with a longitudinal surface engageable with the inner surface of the collar for locking the said latches into engagement with the plunger.

Another object of the invention is to provide an improved chuck wherein a drill inserted between the jaws of the said chuck is automatically supported while the gripping force between the said jaws and the said drill is increased the required amount.

Another object of the invention is to provide a shield for the collar and the spring which urges the collar rearwardly, said shield consisting of a shell fitting about and projecting forwardly from the collar and of such dimensions that it may be readily gripped and forced forwardly to shift the collar forwardly to a latch-releasing position and then cause the body to be non-rotatably moved forwardly to a jaw-releasing position.

Another object of the invention is to provide a chuck in which latches and springs are entirely enclosed and thereby protected from damage and also shielded from dirt or metal particles which might interfere with proper operation of the chuck.

The invention is illustrated in the accompanying drawing, wherein.

Figure 1:
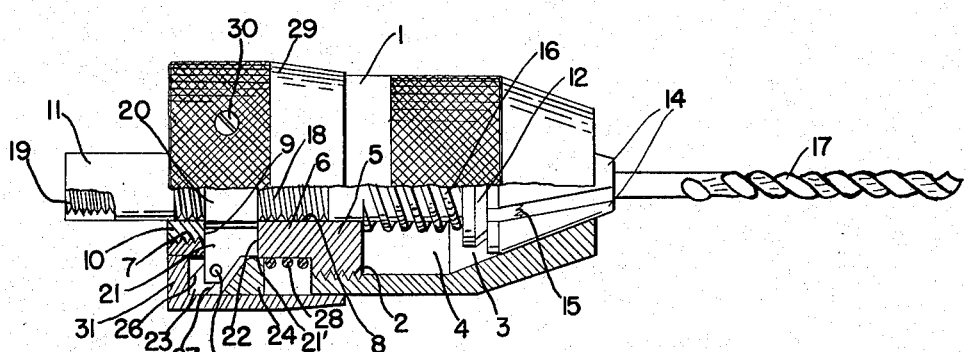
Fig. 1 is a view showing the improved chuck partially in side elevation and partially in longitudinal section.

This improved chuck has hollow body 1 which is formed of steel, or other suitable metal, and is internally threaded at its rear end, as shown at 2. The front end portion of the body is internally thickened and tapered inwardly to form a socket 3 which extends forwardly from a large bore 4 in the rear end of the said body 1 with the annular wall of the socket 3 forming a cam surface.

The rear end of the bore 4 is closed by a block 5 threadedly received therein, said block 5 having a rearwardly projecting neck 6 which is of even external diameter throughout its length. The block is formed centrally with a threaded counterbore 7 and a bore 8 which extend axially thereof. The counterbore 7 threadedly receives a closure ring or bushing 10 which in combination with the shoulder formed at the junction of counterbore 7 and bore 8 forms a recesss 9 in the neck 6 and with the ring 10 forming a continuation of bore 8 rearwardly of said recess.

A plunger or shaft 11 passes through the bore 8 and is slidable longitudinally therein. This plunger has a head 12 at its front end which normally has abutting engagement with the rear ends of jaws 14 mounted in the socket 3 of the body. There are preferably three of these jaws which taper inwardly toward their front or outer ends, and in order to urge the jaws away from each other to an opened position, there have been provided springs 15 which are confined between confronting side edge faces of the jaws and move them apart to the releasing position when the body is shifted forwardly.

A spring 16 is coiled about the plunger 11 with its rear end bearing against the block 5 and its front end abutting the rear surface of the head 12. This spring urges the block and the body rearwardly along the plunger 11 and holds the head in engagement with rear ends of the jaws 14. When the body is shifted forwardly, the jaws separate so that a drill 17 may be fitted between the jaws, and when the body is allowed to be moved rearwardly by the spring, the cam surface formed by the tapered annular wall of the socket 3 will force the jaws toward each other and into a light gripping engagement with the drill. The plunger is threaded, as shown at 18, and in its rear end is formed a threaded recess 19 so that the plunger may be removably mounted upon a shaft, or other suitable support, forming a portion of a lathe or other similar devices adapted for using chucks. It will thus be seen that when the chuck is applied to a lathe, its plunger will be held stationary and its body will be normally held in a rearwardly retracted position, but may be shifted forwardly in order to apply or remove a drill, the spring 16 causing the body to return to its retracted position when the body is released.

Figure 2:
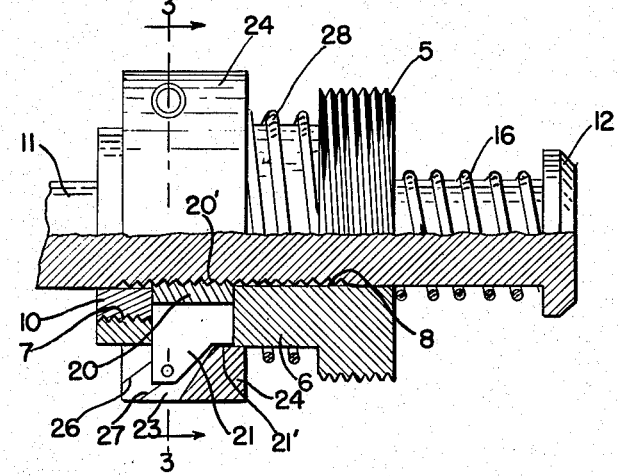
Fig. 2 is a view upon an enlarged scale showing the body and the shield or shell of the chuck removed, remaining elements of the chuck being shown partially in side elevation and partially in longitudinal section.
Figure 3:
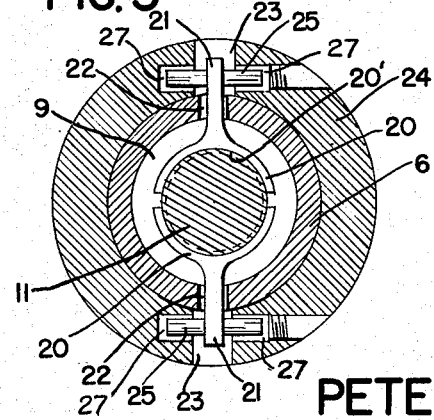
Fig. 3 is a sectional view, taken transversely through the chuck, along the line 3—3 of Fig. 2.

In order to secure the body against longitudinal sliding movement upon the plunger, there have been provided latches 20. These latches extend circumferentially of the plunger in the recess 9 and have their inner faces 20' threaded for engagement with the threads 18 of the plunger. Shanks 21 provided with longitudinal surfaces 21' extend from the latches and pass outwardly through openings 22 formed in the neck 6, outer end portions of the shanks being disposed in openings 23 formed in a collar 24 which fits about the neck 6 and is slidable thereon. Pins 25 pass transversely through the shanks with their end portions projecting from opposite sides thereof, and these end portions of the pins overlap cam surfaces 26 which extend inwardly at the rear of openings 23. This is clearly shown in Fig. 2, and referring to this figure, it will be seen that when the collar 24 is shifted forwardly along the neck 6, the cam surfaces will act upon the pins and exert pull which will shift the latches outwardly to a releasing position and allow the body to be non-rotatably moved longitudinally of the plunger. There have also been provided front cam surfaces 27 which serve to shift the latches 20 inwardly to a gripping position when the cylindrical collar 24 is moved rearwardly by action of a spring 28 which is coiled about the neck 6 with its front end bearing against the block 5 and its rear end engaging the front face of the collar. The collar 24 also serves to lock the latches 20 in their gripping position since a portion of the internal surface of the said cylindrical collar 24 slides over surfaces 21' on the latches 20 as said collar returns to its rearward position.

A shell 29 fits snugly about the collar 24 and is secured thereto by a screw 30. This shell is of such length that its front end portion fits about the rear end portion of the body 1. The shell closes the space between the collar and the body and serves as a shield to prevent dirt from accumulating in this space. The shield also serves to cover outer ends of the openings 23 in the said collar and to prevent damage to the latches or obstruction thereof by accumulation of dirt in these openings. A flange 31 formed about the rear end of the shell engages the rear face of the collar, thus causing the collar to be moved forwardly when the shell is grasped and thrust forwardly.

When this chuck is in use, it is applied to a lathe by screwing the rear end of the plunger upon the chuck carrier of the lathe. In order to apply a drill, the shell is grasped and shifted forwardly. This causes the collar to be moved forwardly, and as it moves forwardly, the latches are withdrawn. Continued forward movement of the shell moves the block and the body with it, and during this movement, pressure upon the jaws by the wall of the socket 3 is removed and the jaws spread apart to an opened position. The drill may then be placed between the jaws, and when the shell is released, the spring 16 shifts the body rearwardly whereupon the jaws grip the drill and the spring 28 returns the shell and the collar to the normal position in which the latches engage the threads of the plunger. The gripping force of the jaws is subsequently increased by rotating the latches and supporting body counter-clockwise relative to the shaft.

Instead of grasping the shell and exerting forward thrust to shift the body forwardly to release the jaws, the body may be grasped and turned in a clock-wise direction to cause the threaded latches to force the block and the body to be rotatably moved forwardly along the plunger until the jaws separate a sufficient distance to allow a drill to be inserted or removed. Since the latches hold the body in the forwardly shifted position in this instance the jaws will remain open. After the drill has been inserted between the jaws, the shell is grasped and shifted forwardly, and during this movement, the latches will be withdrawn and the spring 16 will force the block and the body rearwardly along the plunger until the drill is supported by the jaws. The shell is then released and the latches will be returned inwardly to a position in which they engage the threads of the plunger with the gripping force of the jaws being suitably increased as described above.

From the foregoing description of my improved chuck, the construction thereof and its application to use will be readily understood, and it will be seen that I have provided a simple, inexpensive, and efficient means for carrying out the various objects of the invention.

While I have particularly described the elements best adapted to perform the functions set forth, it is apparent that various changes in use, form, proportion, and in the minor details of construction may be resorted to, without departing from the spirit or sacrificing any of the principles of the invention.

What is claimed is:

1. A chuck comprising a hollow body having its front end formed internally with a circumferentially extending cam surface, a block mounted in the rear portion of said body and having a rearwardly projecting neck and a bore extending longitudinally through the block, jaws in the front end portion of said body moved to a gripping position by the cam surface during rearward movement of the body along the jaws, a plunger passing longitudinally through said bore into said body and engaging rear ends of said jaws, a spring about the portion of the plunger within the body engaging said block and urging the block and the body rearwardly, said plunger having a portion within the bore threaded, said neck being formed with a recess and with side openings leading from the recess, latches in said recess formed with threads for gripping the threaded shaft and having shanks extending outwardly through the side openings, a collar fitting about said neck and slidable longitudinally thereon and formed with side openings into which said shanks project, pins mounted transversely of said shanks and located in the side openings of the collar, a spring urging said collar rearwardly, and cam surfaces associated with said collar engaging said pins and acting thereon to move the latches to a releasing position when the collar is shifted forwardly.

2. A chuck comprising a hollow body having its front end portion formed internally with a cam surface, jaws in the forward portion of said body adapted to be moved towards each other to a gripping position by said cam surface during rearward movement of the body, a closure for the rear end of said body having a rearwardly extending neck and being formed with a bore extending longitudinally therethrough, a threaded plunger passing through said bore into said body and engaging said jaws, a spring carried by said plunger and urging said body rearwardly, latches carried by said neck and movable into and out of gripping engagement with the threads of the plunger, a collar about said neck slidable longitudinally thereon, a spring about said neck urging said collar rearwardly, said collar having cam surfaces engaging portions of said latches and moving the latches to a releasing position when shifted forwardly, and a shell about said collar extending forwardly and fitting about said body.

3. A chuck comprising a hollow body open at its front end and having its front end portion formed with an internal cam surface, jaws in said body moved to a gripping position by said cam surface by rearward movement of the body, a neck extending rearwardly from said body and formed with a bore and with side openings, a threaded plunger passing longitudinally through said bore and engaging rear ends of said jaws, latches engaging threads of said plunger and having shanks passing through the side openings, said latches serving to move the body forwardly to a jaw-releasing position when the body is turned in one direction and releasably holding the body against rearward sliding movement, a spring urging said body rearwardly, a collar about said neck slidable longitudinally thereon and having cam surfaces engaging portions of said shanks and retracting the shanks when the collar is shifted forwardly, a spring urging said collar rearwardly, and a shell mounted about said collar and fitting about the rear portion of said body.

4. A chuck comprising a body, jaws in said body adapted to be moved to a gripping position by rearward movement of the body, a neck extending rearwardly from said body, a threaded plunger passing longitudinally through said neck and engaging rear ends of said jaws, a spring urging said body rearwardly along said plunger, latches carried by said neck and engaging threads of said plunger, a collar about said neck slidable along the neck and having cam surfaces retracting the latches when the collar is shifted forwardly, and a spring urging said collar rearwardly.

5. A chuck comprising a body, jaws in said body adapted to be moved to a gripping position by rearward movement of the body, and movable to a releasing position when the body is shifted forwardly, a plunger engaging rear ends of said jaws and along which said body is movable forwardly and rearwardly, a spring urging said body rearwardly, latches gripping said plunger, a collar shiftable longitudinally and having means adapted to move the latches to a releasing position when moved forwardly, and a shell mounted about and slidably fitting about the body.

6. A chuck comprising a body, jaws in said body adapted to be moved to a gripping position by rearward movement of the body, and movable to a releasing position when the body is shifted forwardly, a plunger engaging rear ends of said jaws and along which said body is movable forwardly and rearwardly, a spring urging said body rearwardly, latches gripping said plunger and adapted to impart forward movement to the body, a collar slidable longitudinally and having means engageable with the latches to retract the latches when the collar is shifted forwardly, and a shell about said collar constituting a hand hold and slidable along said body.

7. A chuck comprising a body, jaws in said body adapted to be moved to a gripping position by rearward movement of the body, and movable to a releasing position when the body is shifted forwardly, a plunger engaging rear ends of said jaws and along which said body is movable forwardly and rearwardly, a spring urging said body rearwardly, latches gripping said plunger, a collar shiftable longitudinally for locking said latches in a gripping position with said plunger and associated means adapted to move the latches to a releasing position when the collar is moved forwardly and into engagement with said plunger when the collar is moved rearwardly, and a shell mounted about and slidably fitting about the body.

8. A chuck comprising a body, jaws in said body adapted to be moved to a gripping position by rearward movement of said body, and movable to a releasing position when the body is shifted forwardly, a plunger engaging rear ends of said jaws and along which said body is movable forwardly and rearwardly, a spring urging said body rearwardly, latches gripping sid plunger and adapted to impart longitudinal movement to said body when the body is rotated relative to said plunger, a collar slidable longitudinally and having cam surfaces engageable with the latches to retract the latches when the collar is shifted forwardly, said collar being adapted to lock the latches in a gripping position with said plunger when shifted rearwardly, and a shell about said collar and slidable along said body.

9. A chuck comprising a body, jaws in said body adapted to be moved to a gripping position by rearward movement of the body, a plunger engaging the rear ends of said jaws and along which said body is movable forwardly and rearwardly, a spring urging said body rearwardly, latches gripping said plunger, said latches being provided with locking surfaces, a collar shiftable longitudinally and having means adapted to retract the latches when the collar is shifted forwardly and to return the latches when said collar is shifted rearwardly, said collar in its rearward position being adapted to engage said locking surfaces on said latches for locking said latches with respect to said plunger, and a shell slidably mounted about said body.

10. A chuck comprising a hollow body having its front end formed internally with a circumferentially extending cam surface, a block mounted in the rear portion of said body and having a rearwardly projecting neck and a bore extending longitudinally through the block jaws in the front end portion of said body moved to a gripping position by the cam surface during rearward movement of the body along the jaws, a plunger passing longitudinally through said bore into said body and engaging rear ends of said jaws, a spring about the portion of the plunger within the body engaging said block and urging the block and the body rearwardly, said plunger having a portion within the bore threaded, said neck being formed with a recess and with side openings leading from the recess, latches in said recess formed with threads for gripping the threaded shaft and having shanks extending outwardly through the side openings, said latches being rotatably mounted on said plunger, said latches and said body being longitudinally movable with respect to said plunger, said shanks having locking surfaces thereon, a collar fitting about said neck and slidable longitudinally thereon and formed with side openings into which said shanks project, pins mounted transversely of said shanks and located in the side openings of the collar, a spring urging said collar rearwardly, said collar in its rearward position being adapted to engage said locking surfaces on said shanks for locking said latches with respect to said plunger, and cam surfaces upon said collar engaging said pins and acting thereon to move the latches to a releasing position when the collar is shifted forwardly and to return said latches into engagement with the threaded shaft when said collar is shifted rearwardly.

PETER P. HEPP.

References Cited in the file of this patent

UNITED STATES PATENTS

| Number | Name | Date |
|--------|------|------|
| 594,587 | Almond | Nov. 30, 1897 |
| 1,935,645 | Lundin | Nov. 21, 1933 |